United States Patent
Obermanns

(10) Patent No.: US 8,208,417 B2
(45) Date of Patent: Jun. 26, 2012

(54) METHOD FOR TRANSMITTING DATA IN A RADIO NETWORK, A RADIO NETWORK AND A RECEIVER

(75) Inventor: Sebastian Obermanns, Mülheim (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 608 days.

(21) Appl. No.: 12/299,423

(22) PCT Filed: May 4, 2007

(86) PCT No.: PCT/EP2007/054352
§ 371 (c)(1),
(2), (4) Date: Aug. 10, 2009

(87) PCT Pub. No.: WO2007/128793
PCT Pub. Date: Nov. 15, 2007

(65) Prior Publication Data
US 2010/0008239 A1    Jan. 14, 2010

(30) Foreign Application Priority Data

May 5, 2006    (DE) .......................... 10 2006 021 100

(51) Int. Cl.
G08C 17/00 (2006.01)
G08B 5/22 (2006.01)
(52) U.S. Cl. ....................................... 370/311; 340/7.34
(58) Field of Classification Search .......................... None
See application file for complete search history.

(56) References Cited

U.S. PATENT DOCUMENTS

| 4,928,274 | A | * | 5/1990 | Gilhousen et al. | ............ | 370/312 |
| 4,979,170 | A | * | 12/1990 | Gilhousen et al. | ............ | 455/12.1 |
| 5,089,813 | A | * | 2/1992 | DeLuca et al. | ............... | 340/7.35 |

(Continued)

FOREIGN PATENT DOCUMENTS

| EP | 1 530 319 A2 | 5/2005 |
| EP | 1 530 384 A2 | 5/2005 |

(Continued)

OTHER PUBLICATIONS

International Search Report mailed Nov. 30, 2007, issued in international application No. PCT/EP2007/054352.

(Continued)

Primary Examiner — Steven H Nguyen

(57) ABSTRACT

The invention relates to a method for transmitting data in a transmission interval (201) using a plurality of time slots (202) and a plurality of transmission channels (203) to a receiver (104A) of a radio network (100) comprising a transmitter (103) and at least one additional receiver (104B). The method according to the invention comprises the following steps: transmitting at least one data packet (204) having an embedded identification key (105) by the transmitter (103) via at least one transmission channel (203) in a time slot (202A) of the transmission interval (201), monitoring the at least one transmission channel (203) by means of the receiver (104A) for data packets (204) transmitted in the time slot (202A), said data packets having embedded identifiers (105) that are assigned to the receiver (104A), and switching the receiver (104A) to an idle state until the end of the transmission interval (201) if the receiver (104A) has received no data packet (204) with the embedded identifier (105A) assigned to the receiver (104A) during the time slot (202). The invention also relates to a radio network (100) and to a receiver (104) that are suitable for carrying out the method.

15 Claims, 3 Drawing Sheets

U.S. PATENT DOCUMENTS

| | | | | |
|---|---|---|---|---|
| 5,740,517 | A | * | 4/1998 | Aoshima ..................... 340/7.34 |
| 5,978,366 | A | * | 11/1999 | Massingill et al. ........... 370/311 |
| 6,515,976 | B1 | * | 2/2003 | Dent et al. ................... 340/7.32 |
| 8,018,969 | B2 | * | 9/2011 | Shim et al. ................... 370/476 |
| 2006/0002421 | A1 | | 1/2006 | Kuwahara et al. |

OTHER PUBLICATIONS

International Preliminary Report on Patentability issued Dec. 10, 2008, issued in international application No. PCT/EP2007/054352.

Yoon et al., "Changes on Downlink Resource Allocation in OFDMA-PHY for Mobility Support," IEEE 802.16 Broadband Wireless Access Working Group, pp. 1-9, Jan. 15, 2004.

3GPP, "$3^{rd}$ Generation Partnership Project; Technical Specification Group Radio Access Network; Physical Layer Aspects for Evolved UTRA (Release 7)," 3GPP TR 25.814 V1.1.1, found at URL http://www.3gpp.org/ftp/Specs/html-info/25814.htm, pp. 1-84, Feb. 2006.

* cited by examiner

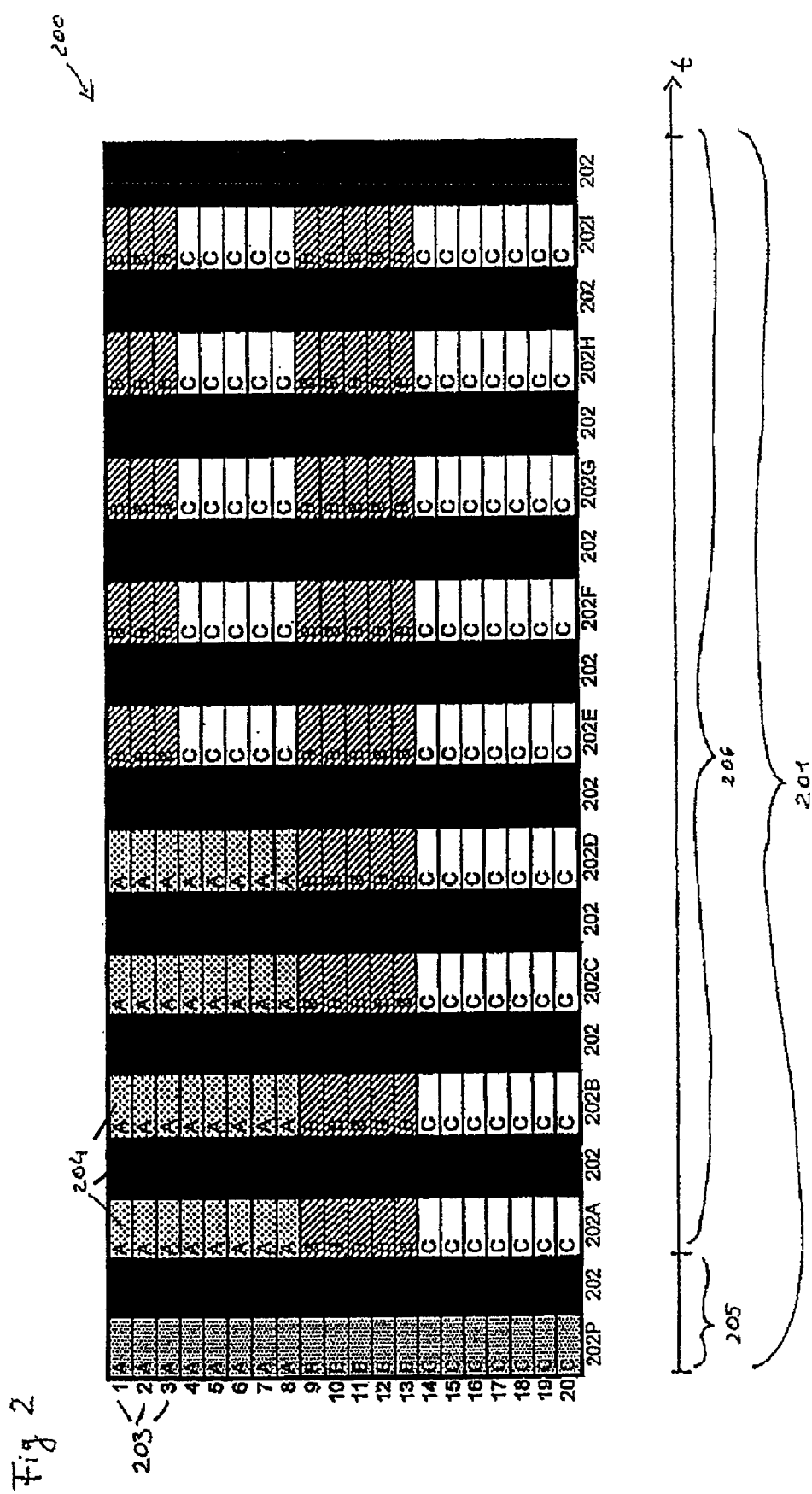

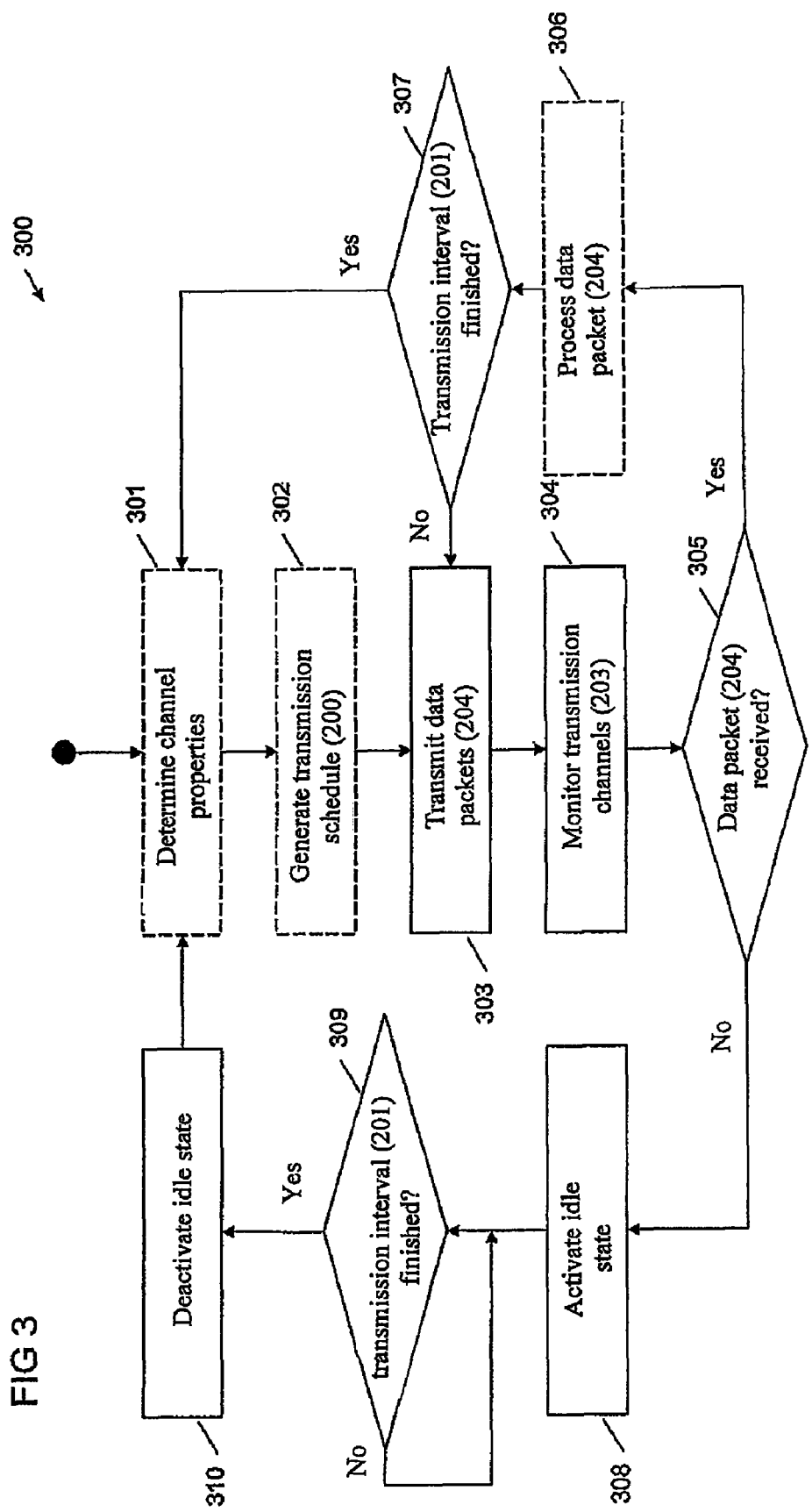

METHOD FOR TRANSMITTING DATA IN A RADIO NETWORK, A RADIO NETWORK AND A RECEIVER

CLAIM FOR PRIORITY

This application is a national stage application of PCT/EP2007/054352, filed May 4, 2007, which claims the benefit of priority to German Application No. 10 2006 021 100.6, filed May 5, 2006, the contents of which hereby incorporated by reference.

TECHNICAL FIELD OF THE INVENTION

The invention relates to a method for transmitting data in a transmission interval using a plurality of time slots and a plurality of transmission channels to a receiver of a radio network comprising a transmitter and at least one additional receiver, and to a radio network and a receiver set up for carrying out the method.

BACKGROUND OF THE INVENTION

Methods for transmitting data in a radio network comprising a transmitter and a multiplicity of receivers are well known. For example, digital mobile telephone radio networks use Frequency Division Multiplex Access (FDMA) methods, Time Division Multiplex Access (TDMA) methods and Code Division Multiplex Access (CDMA) methods for transmitting data to a multiplicity of receivers of a radio cell via a common air interface.

Other transmission methods provide for multiplexing both in the time and in the frequency domains, for example data transmissions according to the Enhanced Data Rates for GSM Evolution (EDGE) standard or by means of the so-called Orthogonal Frequency Division Multiplexing (OFDM). In order to achieve a data transmission rate as high as possible with OFDM systems and an efficient volume with the available bandwidth, the transmission characteristics of individual channels orthogonal relative to each other between a base station and a multiplicity of mobile stations are taken into account and the data transmission is continuously adapted to these. In this way, only those channels on which good receiving properties exist are used for each receiver. This principle is also known under the term "Multi User Diversity" (MUD).

The disadvantages of the known methods are that the scheduling of the use of the available transmission channels is relatively complex and receivers continuously have to monitor a multiplicity of transmission channels for data directed to them, which results in a high energy requirement on the part of the receiver.

SUMMARY OF THE INVENTION

The invention provides a method for transmitting data in a radio network, which is flexible and allows an efficient use of the resources available. Further, a radio network and a receiver will be described which are suitable for carrying out such a method.

According to one embodiment of the invention, there is a method including:
transmitting at least one data packet having an embedded identifier on at least one transmission channel in a time slot of the transmission interval by the transmitter,
monitoring the at least one transmission channel by means of the receiver for data packets transmitted in the time slot, the data packets having embedded identifiers that are assigned to the receiver, and
switching the receiver to an idle state until the end of the transmission interval, if the receiver has received no data packet with an embedded identifier assigned to the receiver during the time slot.

By monitoring at least one transmission channel in the time slot for any data packets directed to a receiver, the receivers which have not received any data in the time slot may be switched to an idle state for any further time slots of the transmission interval. Further, so-called in-band signalling is made possible by embedding an identifier assigned to the receiver, so that no dedicated control channel needs to be used.

In an another embodiment of the invention, the method steps are repeated for each subsequent time slot of the transmission interval for as long as the receiver has received in a previous time slot a data packet having embedded therein identifiers assigned to the receiver. In this way, the receiver may be switched to an idle state, as soon as no further data transmissions are carried out to it.

In a further embodiment of the invention, channel properties of the at least one transmission channel are determined in a measuring phase during an additional step. By determining channel properties, a data transmission to the receiver of the radio network may be scheduled with due consideration of the transmission characteristics or may be adapted to these.

In a further embodiment of the invention, predetermined requirements with regard to data rates, real time conditions or connection qualities are taken into account during the determination of a transmission schedule for the transmission interval, so that connection-specific quality requirements may be met.

BRIEF DESCRIPTION OF THE INVENTION

Further embodiments of the invention are given in the sub-claims. The invention will now be explained in more detail below by means of an embodiment example with reference to the drawings, wherein:

FIG. 2 shows a schematic illustration of a transmission schedule.

FIG. 3 shows a flow chart of a method for transmitting data.

DETAILED DESCRIPTION OF THE INVENTION

Figure 1:
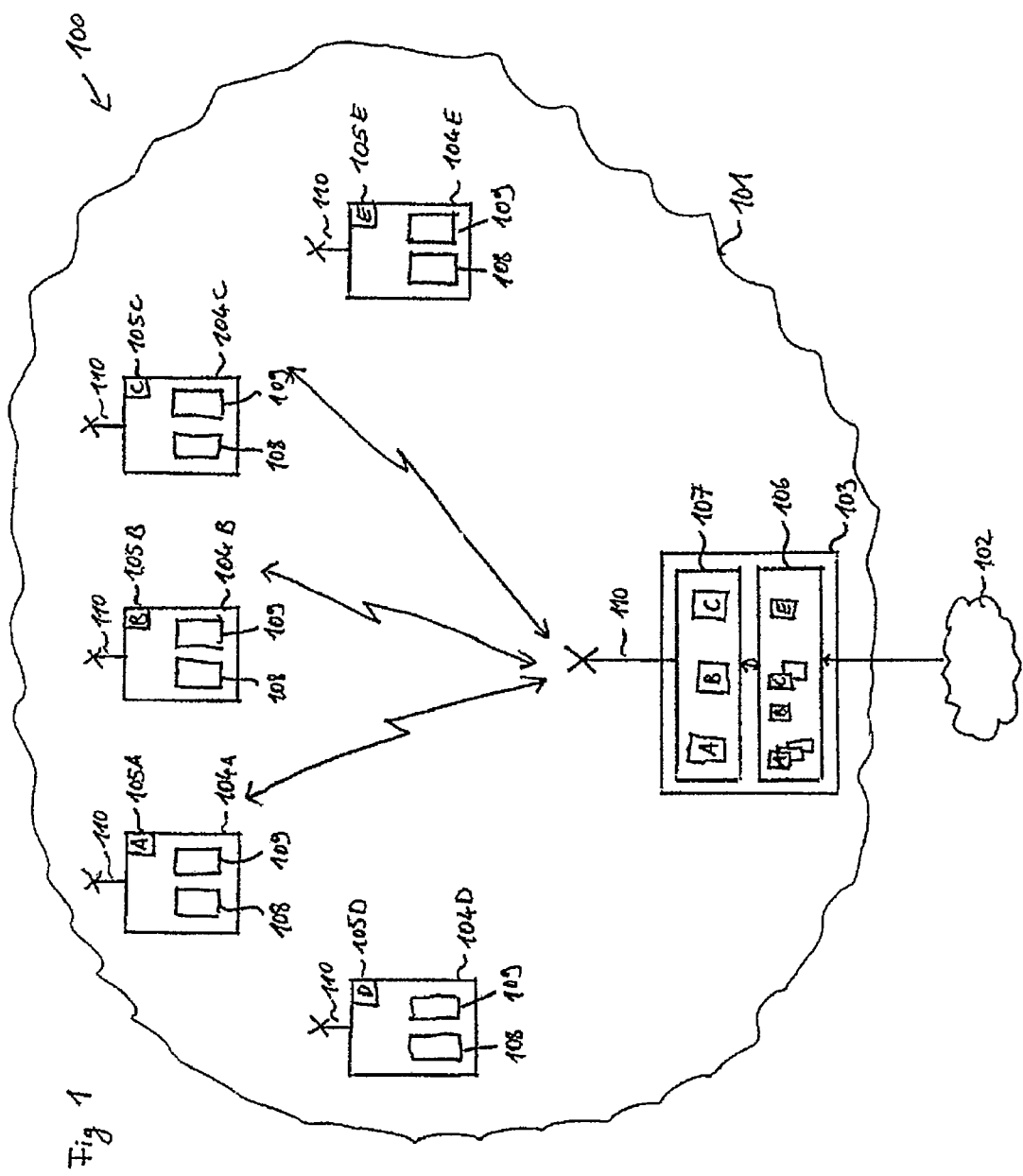
FIG. 1 shows a radio network according to an embodiment of the invention.

FIG. 1 shows a radio network 100 including a radio cell 101, to which a core network 102 is connected. The radio cell 101 includes a base station 103 and five mobile stations 104A to 104E. Each of the mobile stations 104 has a unique identifier 105A to 105E.

The base station 103 includes a connection unit 106, a transmission scheduler 107 and a transmission and receiving antenna 110. By means of the connection unit 106, data connections between the core network 102 and the mobile stations 104 are established and any data packets associated with these connections, if any, are buffered.

On the basis of the available connection data, such as a required data rate of an already established connection and the amount of data buffered in the connection unit 106 for each of the mobile stations 104, the transmission scheduler 107 generates a transmission schedule for the transmission of data from the connection unit 106 to one or a group of mobile stations 104. The transmission scheduler 107 may be a hardware component or a computer program implemented on a processor of the base station 103 or on a computer connected therewith. A combination of hardware and software components is also possible.

When generating the transmission schedule, the transmission scheduler 107 will also take into account the respective channel quality for each of the available transmission channels in each scheduled time slot of the transmission interval. Any information with regard to this will be taken from statistical data, in particular from quality information, bit error rates or signal-to-noise ratios sent back from the mobile stations 104.

Each of the mobile stations 104 has a receiving part 108 and a transmission part 109. Both of these are connected to a combined transmission and receiving antenna 110. The receiving part 108 is set up to monitor a multiplicity of channels of the radio cell 101, in order to detect and filter out any data packets with the unique identifier 105 of the respective mobile station 104. In this connection, the unique identifier 105 or a key independent thereof may also be used for decoding any data transmitted via the radio network 100 in an encoded form, so that each mobile station 104 can decode only data packets directed to it.

In the embodiment example, the radio network 100 is a so-called OFDM radio network. For example, the base station 103 and the mobile stations 104 are a base station of a mobile telephone radio cell and mobile phones within the cell. They may, of course, also be other transmitters and receivers of a radio network 100, for example devices in a so-called wireless LAN (WLAN) data network. Characteristic of each of these radio networks 100 is that a multiplicity of transmission channels and time slots is available, so that the data transmission may be multiplexed both in the time domain and in the frequency domain, which means that both different transmission channels and different time slots may be assigned to individual mobile stations 104.

FIG. 2 shows an example of a transmission schedule 200 for a transmission interval 201. The transmission interval 201 is subdivided into twenty time slots 202 also referred to as "frames". Odd numbered time slots 202 are used for data transmissions from the base station 103 to the mobile stations 104 and are designated as 202P and 202A to 202I. Even numbered time slots 202 are used for data transmissions from the mobile stations 104 back to the base station 103 and are shown shaded in FIG. 2.

In the embodiment example, the transmission interval 201 is additionally subdivided into an optional measuring phase 205 and a data transmission phase 206. The measuring phase 205 comprises a time slot 202P in the downlink direction and a further time slot 202 in the uplink direction and is used for determining channel properties. The data transmission phase 206 comprises the remaining 18 time slots 202 and is used for transmitting payload data.

In this connection, the following general conditions apply for the data transmission phase 206:
- a receiver, for example a mobile station 104, which has not received any data from a transmitter, for example the base station 103, within the current time slot 202, will not receive any data in any of the subsequent time slots 202 either and may therefore be switched to an idle state for the duration of these;
- a receiver, in which the data reception is terminated during the current time slot 202, will not be considered in any of the subsequent time slots 202 and can therefore also be switched to an idle state for the duration of the transmission interval 201;
- in each subsequent time slot 202, more or less transmission channels 203 may be assigned to each receiver.

In the description following below, only the data transmission from the base station 103 to the mobile stations 104 will be described in more detail. Of course, the method according to the present invention may also be used for the return transmission from the mobile stations 104 to the base station 103.

Each time slot 202 is additionally subdivided into a multiplicity of transmission channels 203. In the embodiment example, 20 transmission channels 203 are available for data transmission. The transmission channels 203 may, for example, be different frequency ranges of a transmission band.

During the measuring phase 205, information will be transmitted to all of the mobile stations 104A to 104E in the illustrated transmission schedule 200 corresponding to the first time slot 202P. For example, a predetermined measuring signal may be transmitted from the base station 103 to the mobile stations 104. Alternatively, also control information or other data may be transmitted to the mobile stations 104A to 104E.

During this measuring phase, all of the mobile stations 104A to 104E which are included in a radio cell 101 and are thus assigned to the base station 103, monitor the transmission channels 203 for information, in particular the measuring signal. For the determination of channel properties, for example a reception power of the received measuring signal, a signal-to-noise ratio or a specific bit error rate may be used. In the subsequent time slot 202, these or any values derived there from, which allow the channel quality to be determined, will be transmitted from the mobile stations 104A to 104E back to the base station 103.

As an alternative to a separate measuring phase 205, also other means may be used for determining channel properties. For example, any bit error rates determined in a previous transmission interval 201 or data transmission phase 205 may be used for evaluating the channel quality and thus for scheduling the data transmission in the current transmission interval 201. In order to allow a particularly good evaluation to be made, the measuring phase 205 should be timed so that it is as close as possible to the data transmission phase 206.

The transmission scheduler 107 of the base station 103 generates the transmission schedule 200 for the data transmission phase 206 shown in FIG. 2 on the basis of the determined channel properties. Accordingly, the three mobile stations 104A to 104C are served by the base station 103. Any possible further receivers, for example, any further mobile stations 104D to 104E, are not considered during the data transmission phase 206 for which the transmission schedule 200 was generated.

The reason for this may be, on the one hand, that not enough transmission capacity for serving all of the mobile stations 104 may be available, that no data for transmission to a mobile station 104D is available in the connection unit 106 or that error-free communication is not possible due to interference between the base station 103 and a mobile station 104E.

In all of these cases, the mobile stations 104D and 104E or at least parts of their receiving parts 108, particularly those used for decoding and further processing of received data packets 204, may be switched off or switched to an idle state in order to reduce power consumption. In this way, increased run times of the mobile stations 104D and 104E with the same battery capacity may be made possible. As an alternative to saving energy, the idle state may also be used to accelerate other functions of the mobile stations 104D or 104E, for example by providing more processor time for other tasks.

In spite of these limitations and simplifications on the part of the mobile stations 104, the transmission schedule 200 for the data transmission phase 206 from the base station 103 and its transmission scheduler 107 may be implemented in a flexible manner, so that, for example, different data transmission rates may be made possible within the data transmission phase 206, as is illustrated in FIG. 2.

In the illustrated example, the first mobile station 104A will initially receive data on eight transmission channels 203 at the same time. This data transmission over a relatively broad band, however, will be continued only for the duration of four time slots 202A to 202D. After that, no further data packets 204 will be transmitted to the mobile station 104A. During the time slots 202A to 202D, data will respectively be transmitted to the mobile station 104B or to the mobile station 104C on five or seven transmission channels 203 at the same time.

From time slot 202E onwards, data will be transmitted exclusively to the mobile stations 104B and 104C, so that for the data transmission from this time slot 202E onwards, eight or twelve transmission channels 203 will respectively be available. Since the mobile station 104A does not receive any further data from the base station 103 during the transmission interval 202E, it, too, may be switched to an idle state until the end of the transmission interval 201.

In this way, data transmission rates between the base station 103 and the various mobile stations 104A, 104B and 104C may be adapted to current requirements and channel qualities. If, for example, a data transmission between the base station 103 and the mobile station 104A is possible only in the first time slots 202A to 202D, because after that data transmission is disturbed by interference, data may be transmitted initially in a relatively broad band, so that during the subsequent radio transmission pause, the mobile station 104A will still have available any buffered data for farther processing. Conversely, data transmissions to the mobile stations 104B and 104C will initially be limited, in order to enable a broadband data transmission to the mobile station 104A to be carried out to, and will thereafter be expanded, in order to transmit, if applicable, any data buffered in the connection unit 106 in the meantime to the mobile stations 104B and 104C during the time slots 202E to 202I.

FIG. 3 shows a flow chart of a method 300 for transmitting data from a transmitter, for example the base station 103, to a receiver, for example the mobile station 104A, of a radio network 100.

To start with, the channel properties of the radio network 101 are determined in an optional step 301. These may be determined, for example, during a measuring phase 205 by transmitting a measuring signal to all mobile stations 204 of the radio network and the subsequent return transmission of any reception powers measured by the mobile stations 104. Alternatively, however, the channel properties may be evaluated on the basis of the error rates of previous transmission intervals 201.

In a further optional step 302, the base station 103 generates a transmission schedule 200 for the current transmission interval 201 or its data transmission phase 206. Therein, in particular specific requirements of the mobile stations 104 with regard to required data rates, real time conditions or connection qualities may be taken into account.

However, as an alternative, scheduling for the complete transmission interval 201 may be dispensed with. For example, it is also possible to schedule in advance only for a single or a few time slots 202 of the transmission interval 201, for example, depending on any data buffered in the connection unit 106.

In a further step 303, any data packets 204 will be transmitted from the base station 103 to the mobile stations 104. For example, any payload data made available by a connection unit 106 may be transmitted to the mobile stations 104. To this end, an identifier, for example the unique identifier 105, is embedded into each of the data packets 204, so that a receiver 104 assigned to the identifier may detect any data packets 204 directed to it. In the embodiment example, according to the transmission schedule 200 illustrated in FIG. 2, data packets will be transmitted to the receivers 104A to 104C in the time slot 202A.

In a step 304, all of the active mobile stations 104A to 104E of a radio cell 101 of the radio network 100 monitor at least one of the transmission channels 203 for any data packets 204 directed to them. This may be carried out, for example, by monitoring an identifier embedded in the data packets 204 and by comparing it with a unique identifier 105 of the mobile stations 104.

In a preferred embodiment, a mobile station 104 is set up to monitor all of the transmission channels 203 at the same time. However, due to technical limitations of the receiving part 108 and interferences on individual transmission channels 203 it is also possible to have only individual transmission channels 203 monitored by a mobile station 104.

In a further step 305, each individual mobile station 104A to 104E checks whether any data packets 204 have been transmitted to it from the base station 103 during the previous time slot 202. In the embodiment example, in time slot 202A this applies to the mobile stations 104A, 104B and 104C, not, however, to the stations 104D and 104E.

If in step 305 it is determined that at least one data packet 204 was transmitted to the mobile stations 104A, the data contained therein will be processed in an optional step 306. For example, any payload data contained therein may be decoded or reproduced.

In a further step 307, it will then be checked whether the current time slot 202A was the last time slot of the current transmission interval 201. If this is not the case, the method will be continued in step 303 with the next time slot 202B. Otherwise, the method will restart in step 301 with the determination of channel properties.

As an alternative it is also possible to determine the channel properties anew after each time slot 202. To this end, for example, the time slots 202 shown shaded in FIG. 2 may be used, so that the transmission schedule 200 may be continuously adapted to changing transmission characteristics of the radio cell 101.

If, however, it is determined in step 305 that no data packets were transmitted to the mobile station 104A, as this is the case, for example, in the fifth time slot 202E, an idle state will be activated for the mobile station 104A in a step 308. For example, a reception part 108 of the mobile station 104 may be deactivated.

In step 309, a delay loop checks whether the end of the transmission interval 201 has been reached. During this time, the receiver 104A is in an idle state, so that its energy consumption is reduced. Alternatively, the mobile station 104A may also preferably carry out other tasks during that time, such as an internal data processing, without paying any further attention to any transmitted data packets 204.

At the end of the transmission interval 201, the idle state will be deactivated again in a step 310. Thus, for example, the reception part 108 of the mobile station 104 will again be available in the subsequent measuring phase 205 or data transmission phase 206 of a subsequent transmission interval 201.

The invention claimed is:

1. A method for receiving data from a base station over a network during a transmission interval, the method being performed by a mobile device and comprising:
monitoring at least one transmission channel for one or more data packets transmitted by the base station in a first time slot of the transmission interval, the transmission interval including a plurality of time slots, wherein each of the one or more data packets includes an identifier that is assigned to a particular mobile device;
determining whether one or more data packets have been received during the first time slot via the at least one transmission channel based on whether the one or more data packets includes an identifier corresponding to the mobile device;
in response to determining that one or more data packets have been received, processing the received one or more data packets; and
repeating the determining and the processing steps for subsequent time slots in the transmission interval until (i) determining that no data packet has been received during a subsequent time slot, or (ii) the transmission interval ends;
wherein in response to determining that no data packet has been received during a subsequent time slot, switching to an idle state until the transmission interval ends.

2. The method of claim 1, further comprising: receiving a measuring signal from the base station during a measuring phase of the transmission interval, the measuring phase corresponding to one of the plurality of time slots taking place before the first time slot.

3. The method of claim 2, further comprising:
determining channel properties of the at least one transmission channel based on the measuring signal.

4. The method of claim 3, wherein determining channel properties comprises:
determining a reception quality of the measuring signal; and
transmitting at least one value on based on the determined reception quality to the base station.

5. The method of claim 3, wherein the channel properties of the at least one transmission channel, which were determined in the measuring phase, are used by the base station to determine a transmission schedule for the transmission interval.

6. The method of claim 5, wherein the channel properties, which are used by the base station during the determination of the transmission schedule, includes predetermined requirements corresponding to data rates, real time conditions or connection qualities.

7. A system comprising:
a base station for transmitting data packets over a network, the data packets including an identifier that is assigned to a particular mobile device, wherein the base station is configured to generate a transmission schedule for a transmission interval, the transmission interval including a plurality of time slots; and
a plurality of mobile devices, each of the mobile devices being configured to:
monitor a plurality of transmission channels for data packets transmitted by the base station in a first time slot of the transmission interval;
determine whether one or more data packets have been received during the first time slot via at least one transmission channel based on whether the one or more data packets includes an identifier corresponding to the mobile device;
in response to determining that one or more data packets have been received, process the received one or more data packets;
repeat the determining and the processing for subsequent time slots in the transmission interval until (i) determining that no data packet has been received during a subsequent time slot, or (ii) the transmission interval ends;
wherein in response to determining that no data packet has been received during a subsequent time slot, switch to an idle state until the transmission interval ends.

8. The system of claim 7, wherein the network is an Orthogonal Frequency Division Multiplexing radio network.

9. A mobile device comprising:
a transmitter for transmitting data over a network; and
a receiver for receiving data over the network;
wherein the mobile device is configured to:
monitor a plurality of transmission channels for data packets transmitted by a base station in a first time slot of the transmission interval, the data packets each including an identifier that is assigned to a particular mobile device;
determine whether one or more data packets have been received during the first time slot via at least one transmission channel based on whether the one or more data packets includes an identifier corresponding to the mobile device;
in response to determining that one or more data packets have been received, process the received one or more data packets;
repeat the determining and the processing for subsequent time slots in the transmission interval until (i) determining that no data packet has been received during a subsequent time slot, or (ii) the transmission interval ends;
wherein in response to determining that no data packet has been received during a subsequent time slot, switch to an idle state until the transmission interval ends.

10. The mobile device of claim 9, wherein the mobile device is configured to receive a measuring signal from the base station during a measuring phase of the transmission interval, the measuring phase corresponding to one of the plurality of time slots taking place before the first time slot.

11. The mobile device of claim 10, wherein the mobile device is configured to determine channel properties of the at least one transmission channel based on the measuring signal.

12. The mobile device of claim 10, wherein determining channel properties comprises:
determining a reception quality of the measuring signal; and
transmitting at least one value on based on the determined reception quality to the base station.

13. The mobile device of claim 10, wherein the channel properties of the at least one transmission channel, which were determined in the measuring phase, is used by the base station to determine a transmission schedule for the transmission interval.

14. A method for receiving data from a base station over a network during a transmission interval, the method being performed by a mobile device and comprising:
receiving a measuring signal from the base station during a measuring phase of the transmission interval, the measuring phase corresponding to one of a plurality of time slots;
determining channel properties of at least one transmission channel based on the measuring signal, wherein the channel properties of the at least one transmission channel, which were determined in the measuring phase, are used by the base station to determine a transmission schedule for the transmission interval;

monitoring the at least one transmission channel for one or more data packets transmitted by the base station in a first time slot of the transmission interval, wherein each of the one or more data packets includes an identifier that is assigned to a particular mobile device;

determining whether one or more data packets have been received during the first time slot via the at least one transmission channel based on whether the one or more data packets includes an identifier corresponding to the mobile device;

in response to determining that one or more data packets have been received, processing the received one or more data packets; and repeating the determining and the processing steps for subsequent time slots in the transmission interval until (i) determining that no data packet has been received during a subsequent time slot, or (ii) the transmission interval ends;

wherein in response to determining that no data packet has been received during a subsequent time slot, switching to an idle state until the transmission interval ends.

15. The method of claim 14, wherein the channel properties, which are used by the base station during the determination of the transmission schedule, includes predetermined requirements corresponding to data rates, real time conditions or connection qualities.

* * * * *